(12) United States Patent
Corsini et al.

(10) Patent No.: US 8,239,703 B2
(45) Date of Patent: Aug. 7, 2012

(54) METHOD FOR CONTROLLING TIME BASED SIGNALS TO INDICATE A TIME RANGE FREE OF AN END TIME

(75) Inventors: Giorgio Corsini, Genua (IT); Laurent Cloutot, Killwangen (CH)

(73) Assignee: Siemens Aktiengesellschaft, Munich (DE)

( * ) Notice: Subject to any disclaimer, the term of this patent is extended or adjusted under 35 U.S.C. 154(b) by 386 days.

(21) Appl. No.: 12/538,287

(22) Filed: Aug. 10, 2009

(65) Prior Publication Data
US 2010/0037083 A1    Feb. 11, 2010

(30) Foreign Application Priority Data
Aug. 8, 2008    (EP) .................................... 08014177

(51) Int. Cl.
G06F 1/14    (2006.01)
(52) U.S. Cl. ........................ 713/502; 713/501
(58) Field of Classification Search .......... 713/500–503, 713/330–340; 702/187–188; 703/1–8; 700/28, 700/110
See application file for complete search history.

(56) References Cited

U.S. PATENT DOCUMENTS

| | | | | |
|---|---|---|---|---|
| 5,327,349 | A * | 7/1994 | Hoste | 700/110 |
| 7,069,185 | B1 * | 6/2006 | Wilson et al. | 702/188 |
| 7,218,974 | B2 * | 5/2007 | Rumi et al. | 700/28 |
| 7,689,394 | B2 * | 3/2010 | Furem et al. | 703/8 |
| 2004/0210868 | A1 | 10/2004 | Dutsch et al. | |
| 2008/0215295 | A1 * | 9/2008 | Shiraishi | 702/187 |
| 2011/0231169 | A1 * | 9/2011 | Furem et al. | 703/2 |

FOREIGN PATENT DOCUMENTS
EP    1927912 A1    9/2006

OTHER PUBLICATIONS

Rhombus, "Measuring OEE using the Rhombus Factory Information System",Cambridge, UK, Nov. 2007, pp. 1-20, retrieved from the Internet: URL: http://www.rhombus.co.uk/RhombusOEE.pdf.
"New in Varchart JGnatt 2.2":, XP-002509803, Netronic Software GmbH, Aachen, Germany.
"Netronic News":, Netronic Newsletter, XP-002509804, Sep. 2006, Netronic Software GmbH, Aachen, Germany.

* cited by examiner

*Primary Examiner* — Raymond Phan
(74) *Attorney, Agent, or Firm* — Laurence A. Greenberg; Werner H. Stemer; Ralph E. Locher

(57) ABSTRACT

A method controls time based signals that are outputted from at least two processes of unit. A first signal is converted into a first signal value and indicates over a first time range of a first process with a first defined start time and a defined end time, in which present time is signalized by a spatially extensible and uniformly highlighted portion of the first time range defined between the first start time and the present time. A second signal is converted into a second signal value and indicates over a second time range of a second process with a second defined start time and free of an end time, in which the present time is signalized by a spatially extensible portion of the second time range onto which a variably highlighted and superposed section is overlaid, the section being defined between the second start time and the present time.

8 Claims, 1 Drawing Sheet

METHOD FOR CONTROLLING TIME BASED SIGNALS TO INDICATE A TIME RANGE FREE OF AN END TIME

CROSS-REFERENCE TO RELATED APPLICATION

This application claims the priority, under 35 U.S.C. §119, of European application EP 08 014 177.3, filed Aug. 8, 2008; the prior application is herewith incorporated by reference in its entirety.

BACKGROUND OF THE INVENTION

Field of the Invention

The invention relates to a method for controlling time based signals.

Especially in the technical field of Enterprise-Control System Integration (see e.g. Standard ISA-dS95.00.01-2000, Draft 15, January 2000), it is a major goal to monitor and control time related signals in process management.

Such a control domain shall include the functionality of monitoring production and either automatically correct or provide decision support to operators for correcting and improving in-process functions. These functions may be intra-operational and focus specifically on machines or equipment being monitored and controlled, as well as inter-operational, tracking the process from one operation to the next. It may include alarm management to make sure factory person(s) are aware of process changes that are outside acceptable tolerances.

For this purpose, different kinds of time signals have to be monitored via a monitoring device such as signals representing so called "closed states". The "closed state" time signals are monitorable over a first time range of a first process with a first defined/known start time and a defined/known end time, in which the present time is signalized at a monitoring device by a time bar (also called Gantt bar/chart), and commonly for example in form of a spatially and timely extensible and uniformly highlighted portion of the first time range comprised between the first start time and at least the present time. At the end time of a process, the highlighted portion covers the entire predefined time bar.

A second type of signals is the so called "open states". The "open state" signals are defined for states that have an associated second start time but not yet an end time. They are particularly important for a downtime analysis because they are still valid at the moment of the analysis.

A problem of present monitoring solutions is the fact that "open state" signals are monitored and signalized in a same manner as "closed state" signals, thus making it difficult to differentiate between the two types of signal states.

One goal to be achieved is to provide a monitoring device which makes it possible to differentiate between an "open state" signal and a "closed state" signal.

SUMMARY OF THE INVENTION

It is accordingly an object of the invention to provide a method for controlling time based signals, which overcomes the above-mentioned disadvantages of the prior art devices of this general type.

The goal is achieved according to the present invention by a method for controlling time based signals that are outputted from at least two processes of a unit. At least one first signal is converted into a first signal value and indicates over a first time range of a first process with a first defined start time and a defined end time, in which the present time is signalized by a spatially extensible and uniformly highlighted portion of the first time range defined between the first start time and at least the present time. At least one second signal is converted into a second signal value and indicates over a second time range of a second process with a second defined start time and free of an end time, in which the present time is signalized by a spatially extensible portion of the second time range onto which a variably highlighted and superposed section is overlaid. The section is defined between the second start time and the present time.

The method and a monitoring device configured accordingly make it possible to signalize a "close state" signal by using the uniformly highlighted portion of the first time range and to signalize an "open state" signal by using the variably highlighted portion of the second time range.

The method has the advantage that problems arising in a process flow, involving running, active processes of the "open state" type can rapidly be detected and thus measures can immediately be taken in order to trigger correction steps. Furthermore, processes being in an active state in a process flow, represented by the "open state" signals, can easily be supervised.

Preferably, the variably highlighted and superposed section is provided by a gradually faded portion of the second time range. Advantageously, a different type of highlighting the section as compared to the homogenous highlighting portion is employed, making signaling easily distinguishable and reflects a nature of the process as being not yet terminated by fading out the highlight.

In a preferred embodiment, a modulator provides a first actualizable highlight value associated with the second start time and a second actualizable highlight value associated with the present time. It is preferable that a user is able to define a degree of fading depending on own requirements and a signaling of the "close state" signals, in order to enhance the differentiation between different types of states, especially when several types are present in a same time chart.

Preferably, the modulator calculates a fading ratio for the variably highlighted and superposed sections based on the first value, on the second value and on a time period elapsed between the second start time and the present time. The modulator applies the fading ratio to the variably highlighted and superposed section and periodically updates the portion.

As an "open state" signal represents an ongoing process, the modulator updates the second value, which represents the current time. Thus, the degree of fading changes too, as a time period to apply the fading is augmenting. This advantageously allows a refinement of the monitoring device by signalizing concurrent "open state" processes in a different way, depending on a time period in which each of the "open state" processes has already been running. Typically, lengthy processes are signalized in a more stretched highlighting ratio than short processes or processes which have just started.

In a preferred embodiment, a blinking module switches the variably highlighted and superposed section between a first and a second state, whereby a first and a second brightness value is applied to the first and to the second state respectively. This advantageously allows a separate signalling type for certain required actions or events. For example, the blinking module may be invoked for a certain section in case an error occurs in a process which is expected to last for a minimum specific period of time but it has stopped before. The user defines for which events the blinking module shall be used.

Multiple signals are embedded into at least one single time chart, ideally by bar forms associated with one of: each bar form's respective time range, a common time range for the bar forms. The user advantageously chooses if a common timeframe for all signalled processes shall be used, which helps to identify a dependence of a number of processes upon one another by signalling a time relation between them or for example a start of process which is scheduled to take an action not before another process has ended. If very lengthy processes run concurrently with several short processes, the user may choose to apply a scalable timeframe for each of the processes in order for a signalling to fit within a single time chart.

The time chart is generated as a part of a software application that is stored on a machine for monitoring processing signals that are inputted in the machine from at least one process unit over an interface of the machine. Preferably, the time chart is a software module, for example a dynamic link library, which can easily be embedded into existing application as well as new application developments.

Other features which are considered as characteristic for the invention are set forth in the appended claims.

Although the invention is illustrated and described herein as embodied in a method for controlling time based signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Figure 1:
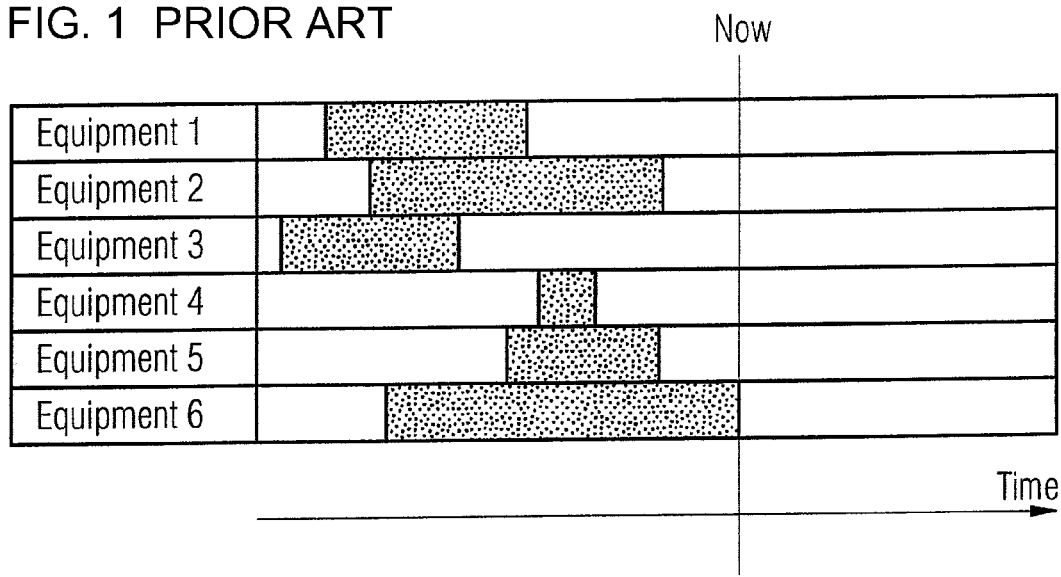
FIG. 1 is a typical representation of a downtime analysis according to the prior art.

Referring now to the drawings of the invention in detail, and in particular to FIG. 1 thereof, there is shown a typical representation of downtime analysis according to the prior art known. The presentation illustrates six equipments 1 to 6, each having a specially highlighted time bar at which something relevant to the downtime analysis has been occurred. For the user, it is impossible to recognize whether some of the highlighted bar represent a close state event having a determined start time and a determined end time or not. For example, Equipment 6 has a downtime event which currently does not have a determined end time. The bar currently last until the present time line but does not indicate whether the down time event will continue to exist or not.

Figure 2:
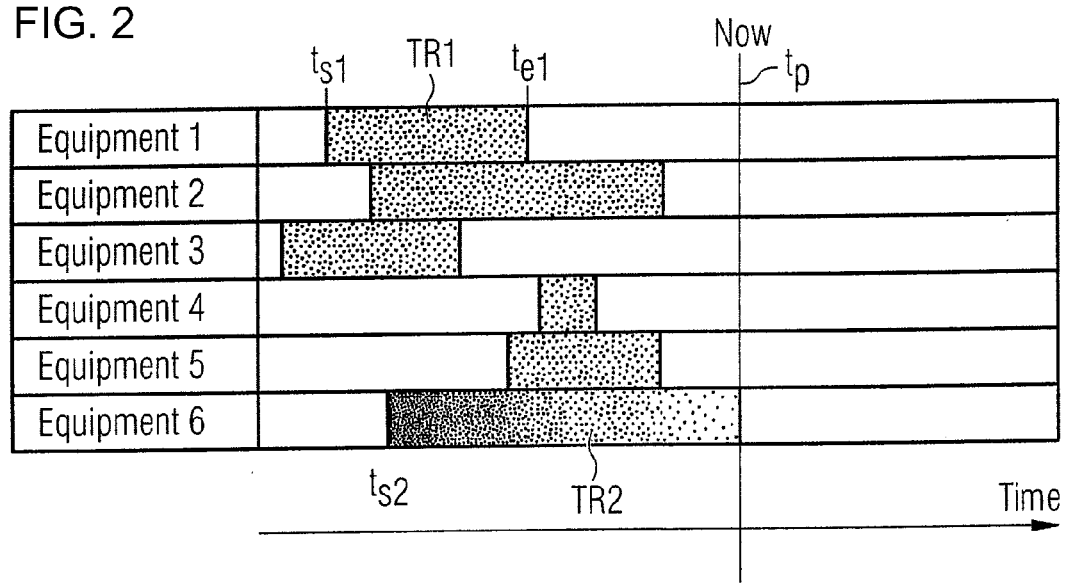
FIG. 2 a typical representation of a downtime analysis according to the invention.

FIG. 2 illustrates a typical representation of a downtime analysis according to the present invention where in the software background a functionality is provided to distinguish in the latter graphical illustration between closed states event and open states events. In particular, the present example illustrates for the downtime event of the equipment 6 that the downtime event is still an open state event without end by changing the graphical representation from a completely highlighted bar to a bar which highlighted portion are fading versus the present time line. A user who analyses this representation now gets a direct representation of any open state event which requires his increased attention immediately.

The concept behind is realized in a way that the software used to prepare the data for the graphical illustration allows to distinguish over those events which have a closed state and those events having an open state. This can be realized by an additional attribute added to the data representing an open state event.

The invention claimed is:

1. A method for controlling time based signals that are outputted from at least two processes of a unit, which comprises the steps of:

converting at least one first signal into a first signal value and indicating over a first time range of a first process with a first defined start time and a defined end time, in which a present time is signalized by a spatially extensible and uniformly highlighted portion of the first time range defined between the first start time and at least the present time; and converting at least one second signal into a second signal value and indicating over a second time range of a second process with a second defined start time and free of an end time, in which the present time is signalized by a spatially extensible portion of the second time range onto which a variably highlighted and superposed section is overlaid, the variably highlighted and superposed section being defined between the second start time and the present time.

2. The method according to claim 1, which further comprises providing the variably highlighted and superposed section by means of a gradually faded portion of the second time range.

3. The method according to claim 1, which further comprises providing a blinking module for switching the variably highlighted and superposed section between a first state and a second state, whereby a first and a second brightness value is applied to the first state and to the second state respectively.

4. The method according to claim 1, which further comprises embedding multiple signals into at least one single time chart, by means of bar forms associated with one of: each bar form's respective time range and a common time range for the bar forms.

5. The method according to claim 2, wherein a modulator provides a first actualizable highlight value associated with the second start time and a second actualizable highlight value associated with the present time.

6. The method according to claim 4, which further comprises generating the time chart as a part of a software application that is stored on a non-transitory machine for monitoring processing signals that are inputted in the machine from at least one process unit over an interface of the machine.

7. The method according to claim 5, which further comprises providing the modulator for calculating a fading ratio for the variably highlighted and superposed section based on the first signal value, on the second signal value and on a time period elapsed between the second start time and the present time.

8. The method according to claim 7, wherein the modulator applies the fading ratio to the variably highlighted and superposed section and periodically updates the portion.

* * * * *